United States Patent

[11] 3,530,796

| [72] | Inventors | Paul Kaiser,<br>Schramberg, Wurttemberg;<br>Josef Mueller, Schramberg-<br>Sulgen, Wurttemberg, Germany |
|---|---|---|
| [21] | Appl. No. | 602,457 |
| [22] | Filed | Dec. 15, 1966 |
| [45] | Patented | Sept. 29, 1970 |
| [73] | Assignee | Gebruder Junghans G.m.b.H.,<br>Schramberg, Wurttemberg, Germany,<br>a corporation of Germany |
| [32] | Priority | Dec. 16, 1965 |
| [33] | | Germany |
| [31] | | J 29,616 |

[54] CLOCKWORK FUZE
1 Claim, 14 Drawing Figs.

[52] U.S. Cl............................................ 102/84,
102/71

[51] Int. Cl.......................................... F42c 9/04,
F42c 9/02, F42c 9/00
[50] Field of Search............................... 102/83, 84,
74(Cursory), 75

[56] References Cited
UNITED STATES PATENTS

| 3,017,781 | 1/1962 | Toomey ..................... | 102/83X |
| 3,286,632 | 11/1966 | Potts, et al................ | 102/84 |

*Primary Examiner*—Benjamin A. Borchelt
*Assistant Examiner*—Thomas H. Webb
*Attorney*—Watson, Cole, Grindle and Watson

ABSTRACT: A clockwork fuze structure has setting members operable from the outside of the fuze for the release times with the setting means having a setting angle $\alpha \leq 360°$, either an angle path $\alpha$ (short) or an angle path of $360° + \alpha$ (long).

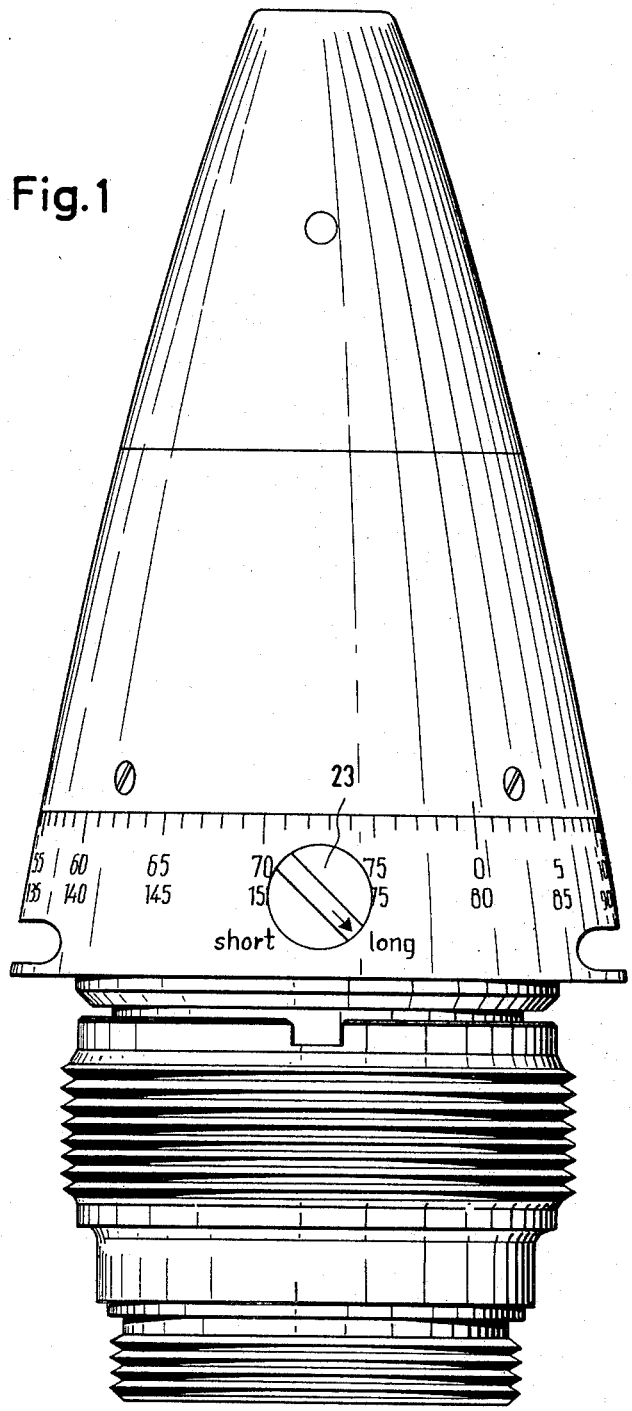

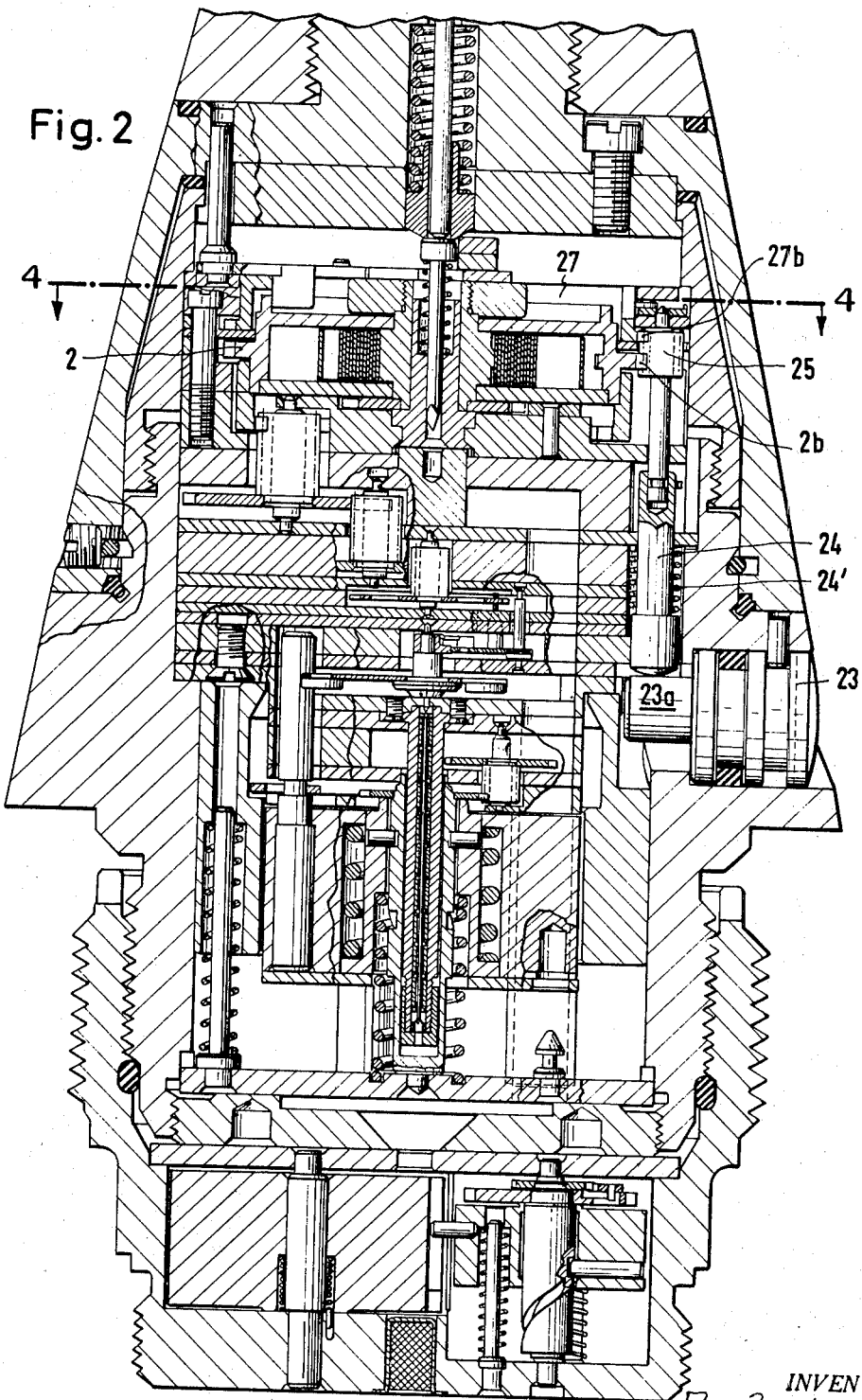

INVENTORS
Paul Kaiser
BY Josef Muller
Watson, Cole, Grindle & Watson
Attys.

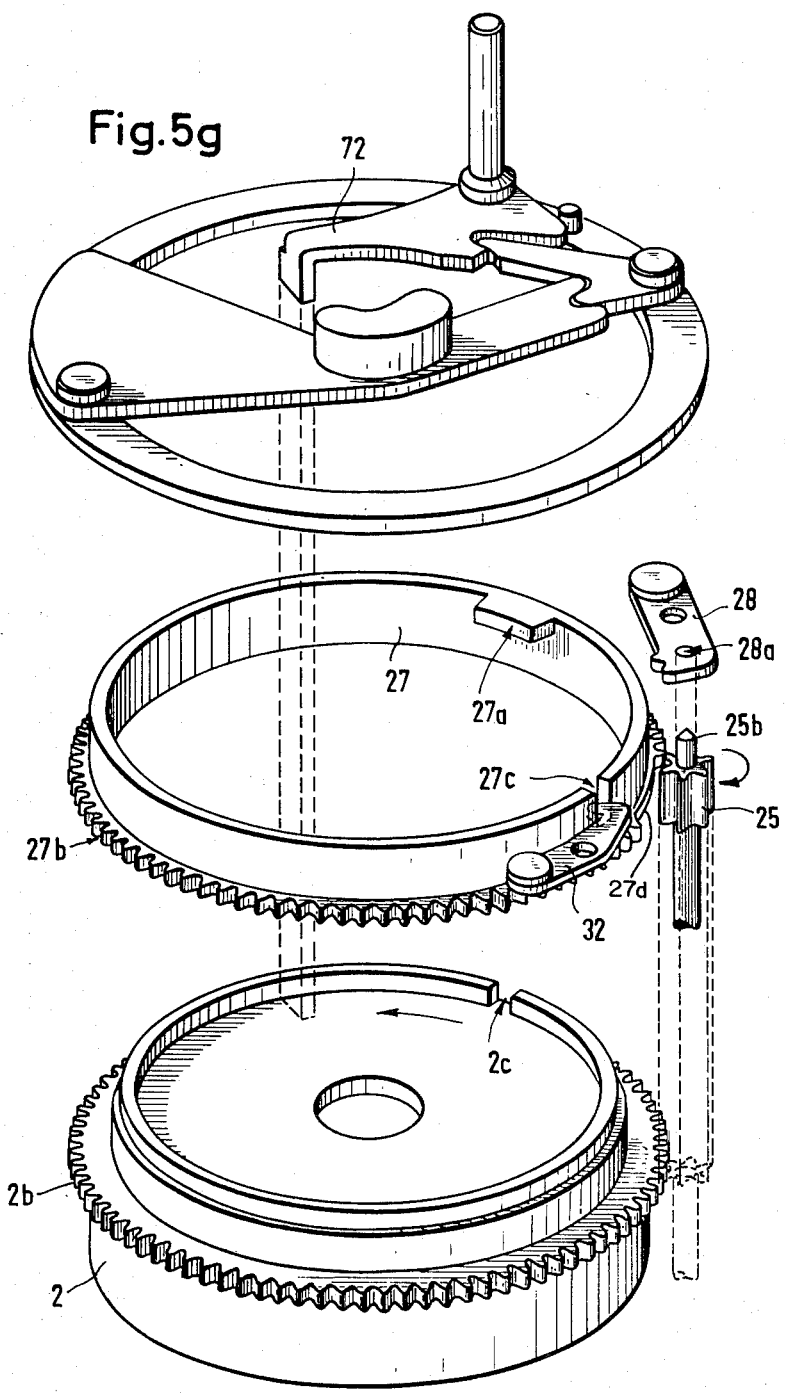

CLOCKWORK FUZE

Known clockwork fuzes are actuated or set by rotating the fuze point or head. The customary fuze setting machines permit only a single setting rotation of the setting elements, in this case therefore the point of the fuze. By means of the invention it is an object thereof to provide a fuze which has only a single rotation of the fuze point, a setting as well for the heretofore release times as also for longer release periods, that is a setting rotation >360°. The invention relates to a time fuze as for instance shown in the German Pat. No. 1,114,124. This known fuze discloses that in the front plate or platen, the clockworks for setting the fuze is mounted and is in permanent couple with the rotatable fuze point or head and which carries the time fall-in lever as well as the pin bolt-release lever. The safety setting means is the time fall-in lever locked by a cam or lug, which projects inwardly and is so wide, that it will lock the passage of the time fall-in lever by the time curve collar in front on the spring housing by a time setting of 0 to 1 second. The fuze head and the setting means are not limited as to rotation.

Known also are time fuzes, in which the fuze heads are rotatable for setting the fuze by a plurality of complete rotations.

In order to prevent this, the invention relates to setting members operable from the outside for the release times, in which the setting means travels by a setting angle $\alpha \leq 360°$ of the setting mechanism either an angle path $\alpha$ (short) or an angle path of $360° + \alpha$ (long), whereby the setting mechanism and a covering member for the "long" setting can be directly coupled together for a limited common movement over at least 360°.

As coupling members there can be provided a further development in a gear drive or rack and pinion drive which can be moved or inserted into adjacently arranged toothed rings of equal number of teeth on the setting mechanism and a ring-like carrier of a covering member, so that the teeth on the carrier or support of the covering member will show an interruption or stop and preferably provided with a stationary element on the end of its drive movement of the carrier of the cover member.

In accordance with another modification, the invention can be arranged at the setting mechanism and at the carrier of the cover member immediately adjacent the gear ring and each of these gears can be brought in mesh with one gear pinion, which are mounted on a common shaft which is adjustable axially from the setting mechanism. The transmission or gearing relationship between the gear rings and the gear is so chosen that the setting member and the cover element by their common rotary movement have such a relative movement that the incidence lever slot will at its earliest, after a complete revolution of the setting elements, be free from the cover element.

Further objects and advantages of the invention will be apparent from the following description when considered in connection with the accompanying drawings in which:

FIG. 1 is a side elevation of the new fuze,

FIG. 2 is a longitudinal middle section of the fuze of FIG. 1,

Figure 3A:
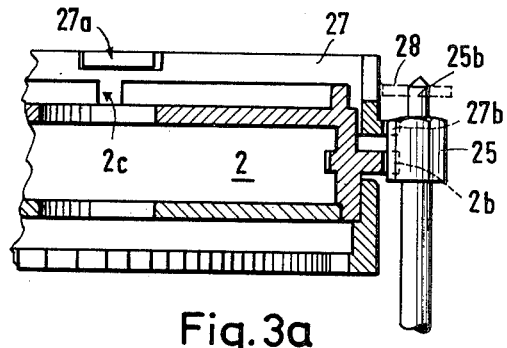
Figure 3B:
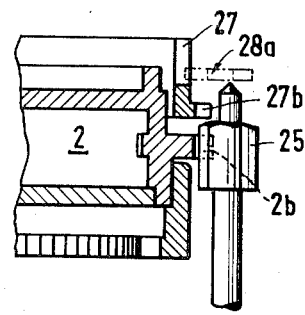
Figure 3C:
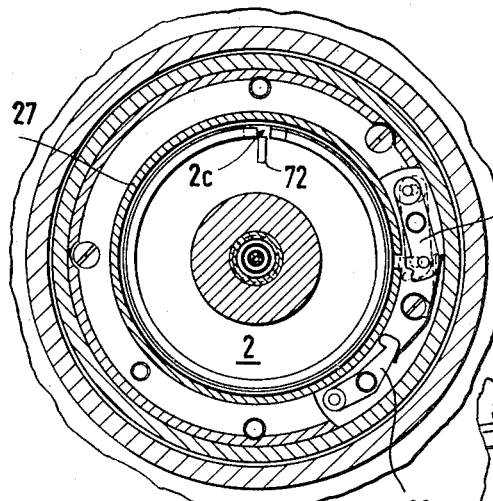
Figure 4:
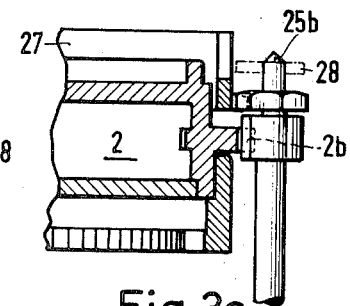
Figure 5:
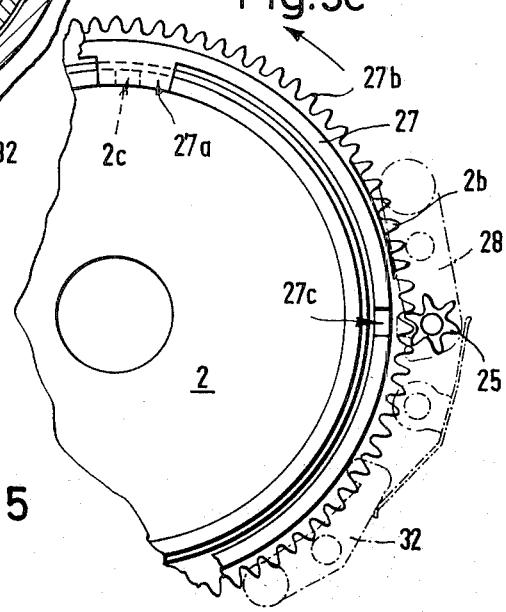

FIGS. 3a, 3b and 3c are longitudinal and part sections on enlarged scale through the coupling drive in different working positions, FIG. 4 is a cross section taken on line 4—4 of FIG. 2 in the direction of the arrows, FIG. 5 is a partial top view of the setting members in accordance with FIG. 3a, FIGS. 5a, 5b, 5c, 5d, 5e and 5f are diagrammatic elevational views showing various set positions of the setting members, and FIG. 5g is an exploded-perspective view of the setting mechanism.

The fuze carries in the fuze point or head, an adjusting or setting pin or bolt, known per se. This setting bolt carries at its inner end an eccentrically arranged lifting cam 23a, FIG. 2, which slides an axially parallel sliding bolt 24 against a load or charged spring 24'. To this sliding bolt 24 a coupling drive 25 is secured by means of a cross pin. This drive contacts or meshes in the position of rest with a known outer gear crown or rim 2b on the spring housing 2. A covering ring 27 is pushed or pressed on the spring housing 2 from the front. This carries the closure cam 27a for the periodic fall-in or interrupting lever 72 which locks through the time-curve collar slit 2c. The cover ring 27 carries equal outer gear teeth 27b on the outside of one of the spring housing teeth or toothing 2b. A snap-link like spring pressed locking lever 28 is mounted tangentially relative to the cover ring 27 in the fuze housing, the arm thereof projecting into the sliding track of the coupling drive 25. The drive 25 is provided with a conical stub axle 25b projecting toward the front and which in orientation or adjustment project into a perforation 28a in the locking lever arm.

The described fuze operates as follows:

When the fuze as hitherto is provided with the usual setting times, as in the application is set for "short", then the setting bolt 23 is positioned so that the coupling drive 25 is forced back to its back position, as shown at FIG. 3b. The gearing grips then alone in the outer gear 2b of the spring housing 2, and the time period of the fuze operates as in accordance with the fuze of German Pat. No. 1,114,124.

By setting to zero, the spring-housing collar slot 2c will be covered by the covering ring 27 with its cam 27a. The covering ring 27 is now prevented as to rotation by the locking lever 28.

If now the setting bolt is to be set for a long period, then the coupling drive is positioned in its front position (FIG. 3a). It is now equilaterally in contact with the spring housing gear 2b as with the covering ring gear 27b. At the same time the coupling drive extension grips in the locking lever 28 and forces it out of mesh with gear 27b of the covering ring 27. This covering ring 27 is now rotatable with the spring housing by means of the coupling drive 25. The covering ring 27 will now almost be taken along with the spring housing 2 over its circumference, so that slots during this time remain covered. This joint rotation will last so long until the coupling drive 25 reaches the interrupted gear portion 27d of ring gear 27b (see FIG. 5g). Thereby the spring housing collar slot 2c by further rotation will be freed, so that the release can proceed normally.

Another release is possible therein, in that the coupling drive 25 can be constructed as a transmission, in that the spring housing 2 will function as a carrier for the setting elements 2a, 2c and the covering elements 27, 27a will carry out a different movement. The transmission at the coupling drive must then be so designed that both structures must rotate with each other, but a relative movement can be carried out together, that the entry slots during the first 360° rotate together with cover and then will be free.

At this point it might be helpful to review the overall mode of operation of the invention, with reference to schematic FIGS. 5a through 5f.

Figure 5A:
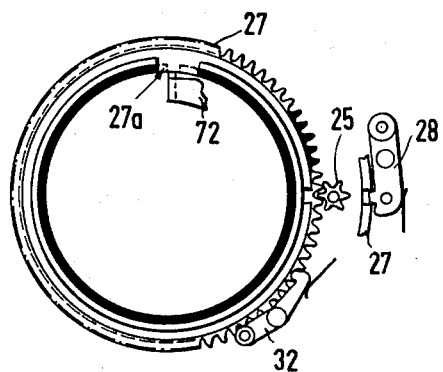

FIG. 5a illustrates components before the fuze has been "set." Actuating means or lever 72 is located in the "zero" position and clutch gear 25 is in its retracted position, i.e, disengaged from ring gear 27b. Mask 27a is disposed in position to blank off the operating slot 2c. Lever 32 is disengaged from slot 27c and lever 28, by virtue of the retracted position of gear 25, and is disposed in locking engagement with slot 27c.

Figure 5B:
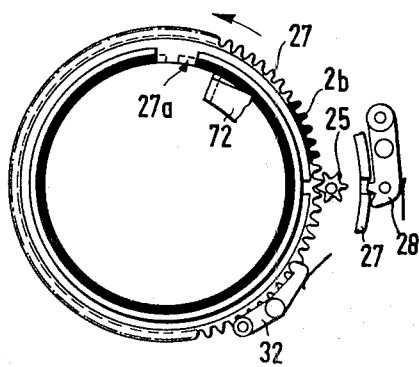

FIG. 5b illustrates the FIG. 5a components after the actuating means 72 has been rotated to provide nearly a full 360° timing increment provided by the rotation of drive means 2. In this connection it will be recalled that drive means or gear unit 2 rotates in a counterclockwise fashion, as shown in the drawings.

Figure 5C:
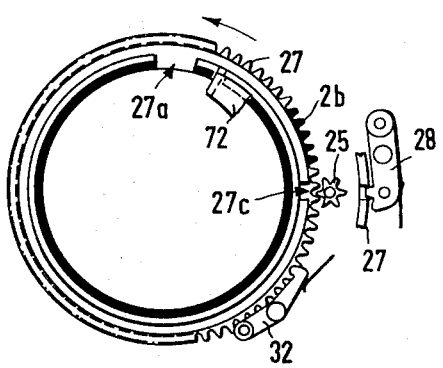

FIG. 5c illustrates the FIG. 5b components after gear means 2 has rotated sufficiently to bring slot 2c into actuating alignment with lever 72.

As will be appreciated, FIGS. 5a through 5c illustrate in sequence the disposition of components for a short increment setting.

Figure 5D:
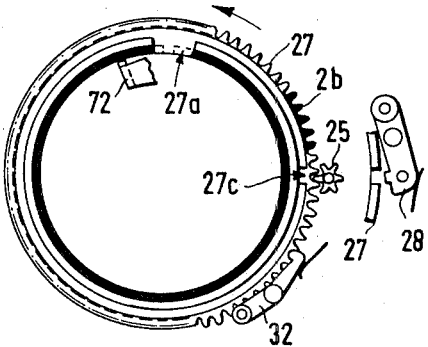
Figure 5E:
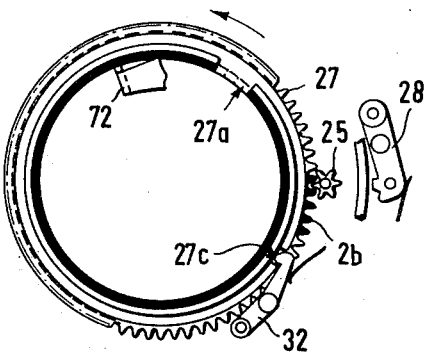
Figure 5F:
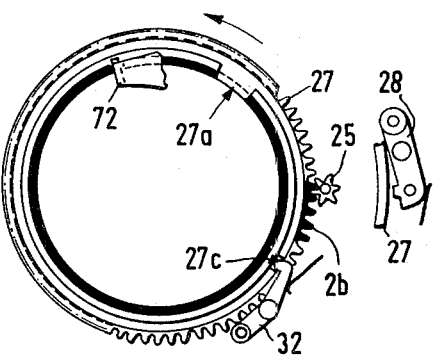

FIGS. 5d through 5f illustrate the setting of the components for a long increment, i.e. as determined by a full revolution of gear means 2 in addition to a partial revolution of this gear means.

As shown in FIG. 5d, cam means 23 has been actuated so as to elevate gear 25 into meshing engagement with gears 2b and 27b. Cam 25b, carried by gear 25, has engaged aperture 28a and moved lever 28 out of latching engagement with disabling means 27. Lever means 72 has been set to provide a timing increment corresponding to a full revolution of ring gear 2 and a fairly small additional angle of clockwise rotation.

FIG. 5e illustrates the FIG. 5d components after the now utilized gears 2b and 27b have rotated, so as to cause the lever 32 to engage the locking slot 27c. When this engagement occurs between the lever 32 and the slot 27c, the gear 25 will be disposed in the interrupted or toothless portion 27d of gear 27b. In this manner, disabling means 27 is immobilized and declutched or separated from gear 2.

Continued rotation of gear 25 induces further rotation of gear 2b so as to bring the components to the FIG. 5f position. In the FIG. 5f position, actuating means 27 has moved into the operating slot 2c.

In describing the invention, reference has been made to a preferred embodiment. However, those skilled in the art and familiar with this disclosure may well recognize additions, deletions, substitutions or other modifications which would fall within the purview of the invention.

We claim:
1. A clockwork fuze comprising:
   actuating means;
   rotatable drive means including operating means operable during one revolution of said drive means to actuate said actuating means;
   rotatable disabling means operable to disable said operating means for at least one revolution of said drive means; and
   selectively operable clutch means operable to drivingly interconnect said disabling means and said drive means for joint rotary movement during one revolution of said drive means and cause said disabling means to prevent said operating means from actuating said actuating means during said one revolution of said drive means and disconnect said disabling means from said drive means during a succeeding revolution to permit said operating means to actuate said actuating means.